United States Patent Office.

EMILE LAMM, OF NEW ORLEANS, LOUISIANA.

Letters Patent No. 65,398, dated June 4, 1867.

---

IMPROVEMENT IN MAKING CRYSTAL SHRED GOLD FOR DENTISTS.

---

The Schedule referred to in these Letters Patent and making part of the same.

---

TO ALL WHOM IT MAY CONCERN:

I do hereby declare that the following is a full and exact description of my process for Making Crystal Shred Gold:

I first make a solution of gold in nitro-muriatic acid by the usual process well known to chemists and metallurgists. I then, without evaporating the solution, add as much as two-thirds of pure water to this solution of gold. I then take one-third of the weight of gold dissolved of pure sugar. I then procure a glass balloon or mattress, which I cut off at the top, making it a sort of deep evaporating dish. I then set the whole over a steam bath. As soon as I perceive the gold forming into leaves, shreds, or fibres floating on top the liquid, or sticking to the sides, or falling to the bottom of the glass vessel, and think their fabric is strong enough to bear handling, I lift them out of the liquid with a vulcanized India-rubber spoon or dipper attached to a glass rod and place them on a filter. I continue this operation until the sugar in the solution aided by heat has caused all the precipitation of gold in the form above described. I then take this gold, wash it thoroughly, dry it on the filter, so as to handle it as little as possible. I weigh it in given quantities, and heat it in little porcelain crucibles to a dull red heat. It is then ready to be used in filling carious teeth.

What I claim simply as new in this in the process above specified is, the perfect control I obtain for making shred or gold fibres of the consistency best suited for filling teeth. In my first process the gold shreds obtained too much weight or thickness. They being only lifted out of the solution when the gold had ceased precipitating, their thickness depended necessarily upon the amount of gold in solution or surface deposited upon. Therefore, to make shreds of the proper lightness and consistency, it required a great number of vessels to make it in, or, in other words, a very extended surface to deposit upon. By the improvement above specified I claim that the process is vastly simplified, enabling any one to make gold shreds with much less trouble and expense, and of the consistency most desired. Therefore, as my invention consists in the application of the above-specified process, (as described also in my application for patent for fibrous gold, dated March 19, 1867,) for improvement in making shred gold, what I wish to secure by Letters Patent, is—

The above process, or any other process substantially the same as specified.

E. LAMM.

Witnesses:
ATE. CROMBACH,
ALCEE J. KER.